Dec. 31, 1940.   E. J. HEFELE   2,226,930
BLIND LANDING DEVICE
Filed July 26, 1937   3 Sheets-Sheet 3
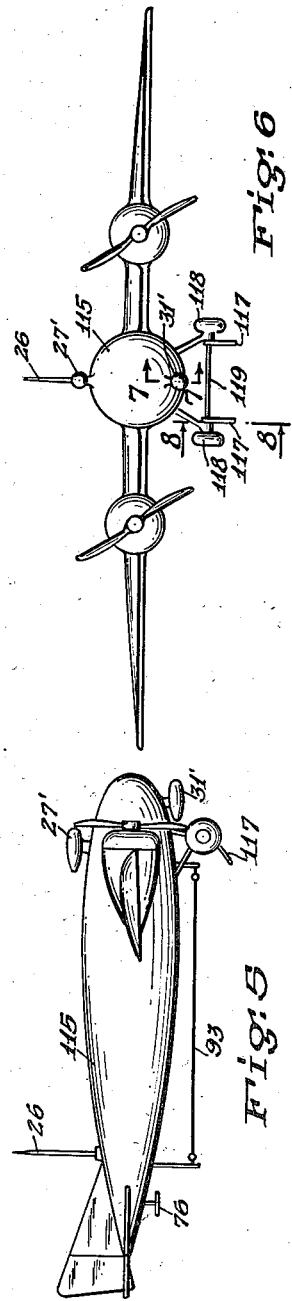
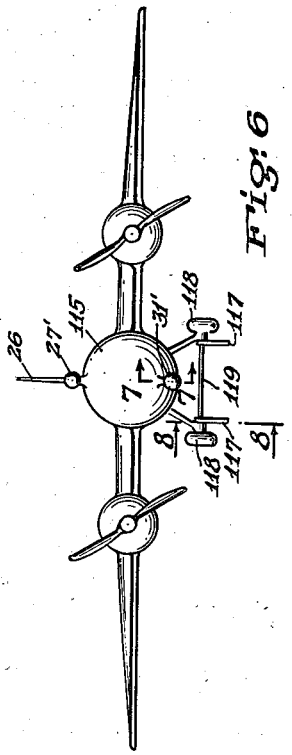
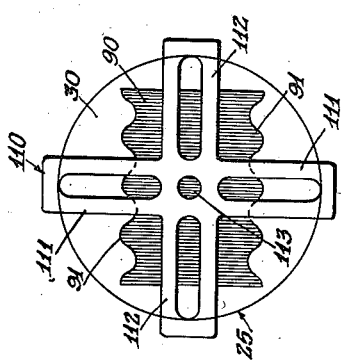
INVENTOR.
Edward J. Hefele
BY Samuel Ostrolenk
ATTORNEY.

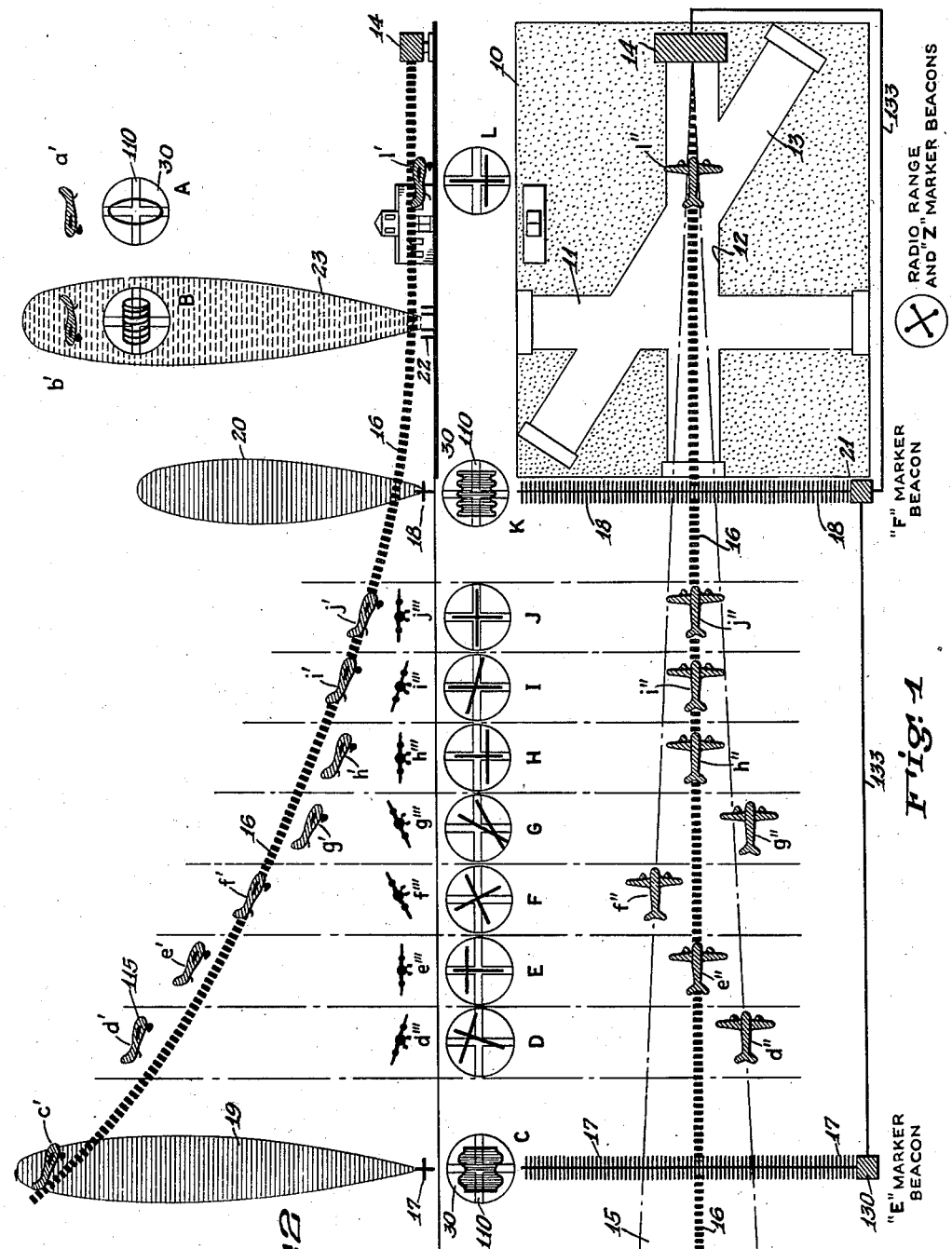

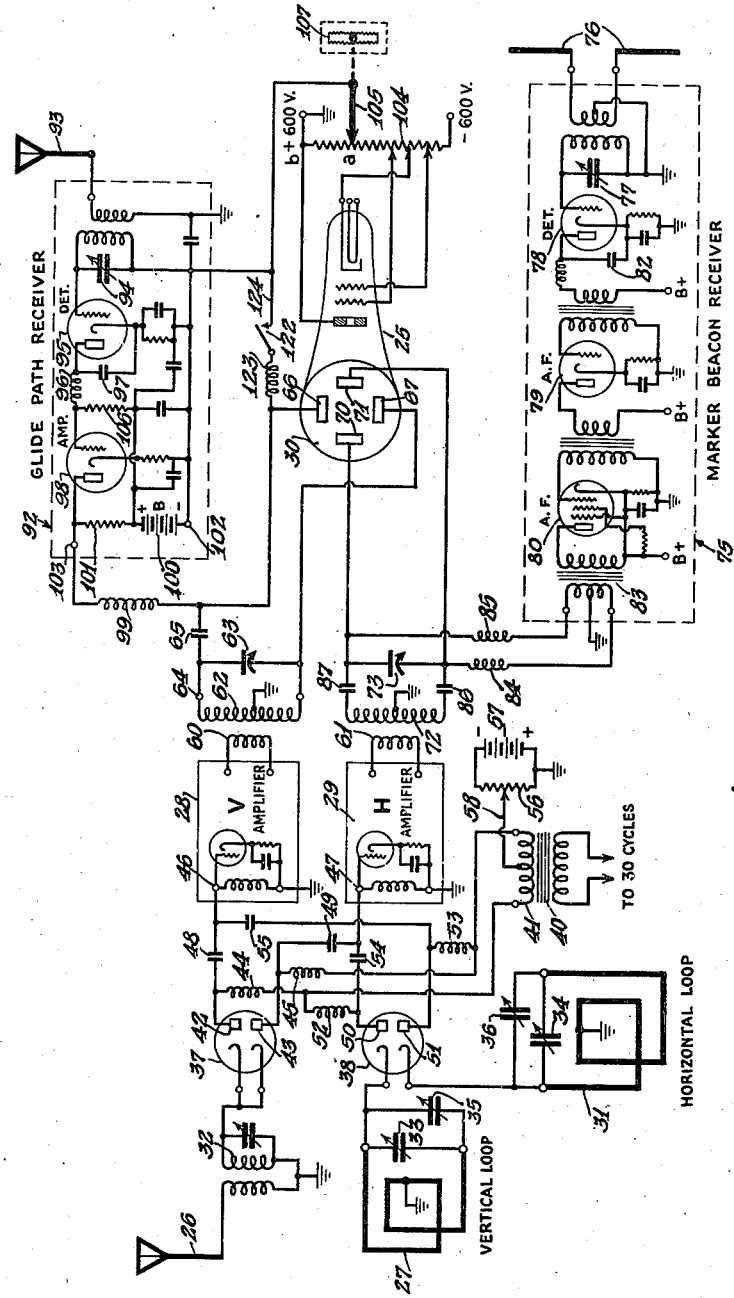

Patented Dec. 31, 1940

2,226,930

UNITED STATES PATENT OFFICE 2,226,930

BLIND LANDING DEVICE

Edward J. Hefele, Amityville, N. Y.

Application July 26, 1937, Serial No. 155,581

19 Claims. (Cl. 250—11)

This invention relates to radio guidance systems and more particularly relates to a composite radio blind landing indicator system combining in a unitary indicator a plurality of requisite functions for blind landing.

Blind landing systems are becoming of greater commercial importance since they make possible instrument landings during all types of weather conditions about the airport. The present invention particularly relates to the blind landing system whereby a predetermined glide path is formed by radio signals producing a suitable pattern above the airfield in conjunction with several other types of marker and directional beam transmitters, as will be hereinafter described in detail.

The plurality of indications necessary to apprise the pilot of accurate three-dimensional orientation with respect to the landing field has heretofore been accomplished by several indicating instruments. It is naturally difficult for the pilot to accurately watch a plurality of indicators while performing the difficult manoeuvres for blind landing.

In accordance with my present invention I contemplate combining the plurality of indicators into a single cathode ray indicator so that the pilot can ascertain the plurality of indications from the single screen of the cathode ray tube. The present invention is a continuation of the right-left cathode ray direction indicator disclosed in my copending application Serial No. 43189, entitled "Right-left indicating direction finder system" filed October 2, 1935, and my co-pending application Serial No. 139,142, entitled "Automatic radio direction indicator system" filed April 27, 1937. The advantages of the unitary indicator reside in minimizing the requisite amount of equipment for the aircraft, which is an important factor as regards to weight and maintenance. The same indicator and equipment is used for long-range radio directional guidance in a manner disclosed in my application Serial No. 43,189.

The single indicator using the cathode ray tube performs accurate right-left indications in accordance with the direction of the directional indicator to the transmitted radio waves, free of electrical and other errors of the radio system. The right-left indications as employed in the original application Serial No. 43,189 are arranged so that an on-course indication produces a vertical line image upon the cathode ray screen.

In accordance with the present invention directional guidance is indicated by a vertical on-course line pattern, and a further horizontal line image is superimposed upon the screen to apprise the pilot of his position with regard to the predetermined glide path during landing. The horizontal line image is produced simultaneously with the vertical right-left directional image by means of electronic switching of the respective indicators to the two independent radio amplifiers, as will be more fully described hereinafter. The electronic switching is above the visual persistence frequency so that both line images appear stationary on the screen. When the plane is above or below the predetermined glide path level, the horizontal line indication will correspondingly move above or below the normal horizontal position on the screen.

I further provide means whereby when the aircraft comes within the field of a marker beacon, a predetermined pattern appears upon the fluorescent screen of the cathode-ray tube to apprise the pilot of his exact distance from the landing field. By providing different marker beacon visual patterns on the screen, the pilot can know in a positive manner which marker beacon he is passing over.

In accordance with a further provision of my present invention I provide a horizontal loop antenna coacting with vertically polarized waves transmitted by the localizer beacon of the landing field in order to indicate the degree of tilting of the plane during landing. Thus the pilot by observing the horizontal indication on the screen, the angular deflection of which is controlled by the horizontally disposed loop antenna, can tell the degree of tilt of his aircraft so that he can maintain a horizontal position of the plane during blind landing. A tilting angle of the plane causes the fixed horizontal loop to tilt with respect to the vertically polarized radio waves to cause a corresponding angular deflection of the electronically switched horizontal line image. The horizontal line image is produced as a result of the glide path signals causing it to rise above or below its normal horizontal position together with the angular deflection caused by the horizontally disposed loop to show the tilting of the plane.

In accordance with my present invention I also contemplate an indication corresponding to the instant before landing of the aircraft so that the pilot can prepare for the impact of the plane upon the ground during the blind landing. I accomplish this result by projecting a rod or suitable structure beneath the tires of the landing gear in order to actuate a switch which is connected to the cathode ray tube to alter its indications. In a preferred embodiment I cause the landing switch closure to move the horizontal line image to correspond to a position substantially beneath the glide path so that the natural impulse for the pilot would be to raise the plane and thereby facilitate the accurate landing of the plane on the field.

It is accordingly an object of my present invention to provide a novel composite blind landing indicator system.

Another object of my present invention is to provide a novel composite cathode ray tube radio indicating system.

Still another object of my present invention is to provide a novel composite indicator for indicating all the necessary factors required by a pilot during blind landing upon an airfield.

A further object of my present invention is to provide a novel composite cathode ray tube indicator for indicating the on-course, glide path position and tilting of the aircraft with respect to predetermined radio wave transmissions.

Still a further object of my present invention is to provide a novel indication on the cathode ray tube indicator corresponding to marker beacon reception to positively indicate the distance of the air craft with respect to the landing field.

Another object of my present invention is to provide a novel indicating system to apprise the pilot immediately before landing of the aircraft.

These and other objects of my present invention will become apparent in the following description taken in connection with the drawings, in which:

Figures 1 and 2 are plan and elevational views respectively of the landing field with the associated radio transmitters and the radiation patterns in combination with various positions of the air-craft with respect to the radiation patterns, the diagrams A to L being different representations on the composite indicator for the corresponding air-craft positions indicated.

Figure 3 is a schematic representation of a preferred form for carrying out the principles of the composite indicator of my present invention.

Figure 4 is an end view of the composite indicator with an index showing a marker beacon signal pattern thereon.

Figures 5 and 6 are elevational and front views respectively of an air-craft containing the plurality of antennae necessary for carrying out my present invention.

Figure 7 is a vertical cross-sectional view corresponding to the view taken along 7—7 of Figure 6 through the horizontal antenna structure.

Figure 8 is a diagrammatic representation of the landing switch and corresponds to the view taken along 8—8 of Figure 6.

Figures 1 and 2 are respectively plan and elevational diagrammatic views of a conventional blind landing air field including representations for different positions of the air-craft with respect to the glide path. The airport proper 10 contains lanes 11, 12, and 13 for air-craft landing. The diagram illustrates landing in conjunction with lane 12 at one end of which a radio transmitter station 14 is located, transmitting a conventional A—N signal beam; zone 15 represents the equi-signal area for the A—N signals. At the same transmitter 14 which is generally termed the localizer transmitter, is also situated an ultra-high frequency glide path transmitter which radiates a lemon-shaped beam, a predetermined equi-potential zone of which is indicated by the broken line 16.

The blind landing radio beam system herein employed and used to automatically provide the pilot with a three-dimensional gliding path from any point above the airport on to a selected runway or lane within the airport limits, is for example, described in the publication "Aero Digest" of September 1936 on page 60. Further associated with the airport, we find marker beacon transmitters 17 and 18 which radiate vertical patterns indicated in elevation by 19 and 20 respectively. The vertical radiation patterns are narrow in width and extend across the path denoted by the marker beacon antenna arrays 17 and 18.

The marker beacons are preferably operated at an ultra-high frequency, for example 75 megacycles. The E marker beacon is located at about 1½ miles from the airport and the F marker beacon is situated within a thousand feet of the incident edge 21 of the airport 10. Both marker beacons operate at the same frequency so as to actuate an indicator operated by a preset ultra-high frequency receiver.

The A—N transmitter at 14 is preferably operated at the commercial frequency for this type of transmitter, namely 278 kilocycles. As is well known, when the aircraft is to the right or left of equi-signal zone 15, the pilot will receive either the A or N counterparts of the dot-dash signals which merge into a continuous tone in the equi-signal zone 15.

The glide path transmitter located at localizer transmitter station 14 is operated at an ultra-high-frequency, for example 90 megacycles. The ultra-high frequency uni-directional glide path beacon transmitter radiates the signals so as to produce a signal intensity pattern of a predetermined intensity and configuration conforming to the indicated path 16. The shape of the glide path 16 may be varied to suit the flying conditions, obstructions and other factors which the pilot would normally watch for in his landing course without radio guidance.

A radio range beacon 22 is located near the airport and is used by the pilot in approaching the airport from a distance. It is operated at the commercial air-craft frequency band, namely at a frequency between 200 and 400 kilocycles. The pilot approaches the radio range beacon 22 in the normal manner employing ordinary radio direction guidance apparatus. A right and left indicator disclosed in my co-pending application Serial No. 43,189 may be used in the approach to the radio range beacon 22 which is located in the vicinity of the airport 10.

My present invention is directed to modifying the right-left indicator of the application Serial No. 43,189 to embody the automatic translation of the plurality of blind landing signals upon a unitary indicator tube to form the composite indicator for the pilot. I prefer to employ a Z marker beacon to produce the antenna pattern 23 at the position corresponding to the cone of silence for the radio range beacon 22. The antenna array of the Z marker beacon is confined to the cone of silence and may be generated by the system such as that described on page 62 of "Aero Digest" of September 1936. The frequency of the Z marker beacon is identical with that of E and F marker beacons, namely 75 megacycles.

Figure 3 is a schematic electrical diagram for the composite indicating system of my present invention employing a cathode ray tube 25. The basic principles for the cathode ray tube employed as a right-left indicator in conjunction with the vertical antenna 26 and directional or loop antenna 27 using independent radio frequency amplification channels 28 and 29 is fully described in my co-pending application Serial No. 43,189 above referred to and reference is herewith made for a complete detailed explanation of the theory and operation of the cathode ray tube indicator for producing a straight line indication corresponding to the directional signals.

In the present modification, two linear beams are produced upon the screen 30 of the cathode ray tube 25; the vertical beam corresponding to the right-left directional indications similar to the basic right-left indicator application Serial No. 43,189; the horizontal beam corresponding to the position of the air-craft with respect to the predetermined glide path 16 as will be hereinafter further described in more detail. The horizontal line image will change its vertical position on the screen 30 with respect to the normal or central horizontal position in accordance with the position of the air-craft above or below the predetermined intensity signal reception from the glide path pattern 16.

By employing a second loop antenna 31 oriented in a horizontal position, and by properly combining the signals from the horizontal loop with the non-directional antenna 26, the horizontal line indication will be inclined in accordance with the angular inclination or sidewise tilt of the air-craft itself. This is accomplished by employing vertically polarized beam transmission of the localizer beacon 14 which transmits the A–N signals.

In blind landing operation, the non-directional antenna 26 is tuned to the localizer frequency of 278 kilocycles corresponding to the A–N signals by its associated tuning means 32. The vertical loop antenna 27 is similarly tuned by the associated condenser 33 to the same frequency of 278 kilocycles. The horizontal antenna 31 is likewise tuned to the localizer beacon by its associated tuning condenser 34. It is to be understood that a unitary tuning control is entirely feasible for the circuits of the antennae 26, 27 and 31 as well as for the tuning circuits of associated amplifiers 28 and 29. The vernier tuning condensers 35 and 36 connected in parallel across the respective loop tuning condensers 33 and 34 are used to properly phase the signals impressed upon the cathode ray tube 25 to produce a straight line indication as described in the parent case Serial No. 43,189.

In accordance with my present invention the received signals are introduced into the H and V amplifiers in a predetermined manner to produce the vertical and horizontal indications on the screen 30 of the cathode ray tube 25. I prefer to employ electronic switching for this operation although mechanical switching may instead be used. The switching frequency need only be above the visual persistence frequency, a frequency of 30 cycles being satisfactory. The signals from the vertical antenna 26 are alternately introduced into the V and H amplifiers by means of the double rectifier tube 37. The vertical loop and horizontal loop signals are correspondingly successively introduced to the H amplifier and the V amplifier.

The vertical loop antenna signals are introduced to the H amplifier simultaneously with the introduction of the non-directional antenna signals to the V amplifier in order to produce the vertical line right-left indications on the screen 30 in accordance with the normal operation of the cathode ray tube indicator as described in the application Serial No. 43,189. The alternate cycle of operation comprises the introduction of the non-directional antenna 26 signals to the H amplifier during the introduction of horizontal loop 31 signals to the V amplifier to produce the horizontal line image indications upon the screen 30. Since the frequency of switching is above the visual persistence frequency, both line images will be visible upon the fluorescent screen 30 as two independent indications. The pilot by watching both indications on the screen is accurately apprised of all the necessary information for his blind landing maneuvers by radio guidance.

The electronic switching is accomplished as illustrated by two double diode rectifier tubes 37 and 38. It is to be understood that triode or pentode amplifier tubes may be equally well employed as well known in the electronic switching art. A source of 30 cycle alternating current is introduced to the primary of the transformer 40. The opposite terminals of the secondary winding 41 of the transformer 40 are respectively connected to the anodes 42 and 43 of the non-directional switching tube 37 through radio frequency choke coils 44 and 45. The output of the anodes 42 and 43 are respectively connected to the input terminals 46 and 47 of the V and H amplifiers through blocking condensers 48 and 49. As will now be evident to those skilled in the art, the rectifier sections 42 and 43 will be alternately conductive at a frequency of 30 cycles corresponding to the periods when the anodes are respectively positive. Accordingly the non-directionally received signals from antenna 26 will be alternately applied to the inputs 46 and 47 of the V and H amplifiers.

In a similar manner, the anodes 50 and 51 of the loop antenna switching tube 38 are rendered alternately conductive by the connection of the opposite terminals of the secondary winding 41 of of the transformer 40 to the anodes 50 and 51 through radio frequency choke coils 52 and 53. The output of the rectifier sections 50 and 51 are respectively introduced to the H and V amplifiers through the blocking condensers 54 and 55. The radio frequency choke coils 44, 45, 52 and 53 serve to prevent the short-circuiting of the radio frequency currents through the winding 41 of the transformer 40. The blocking condensers 48, 49, 54 and 55 serve to block the passage of the audio frequency currents into the input circuits of the V and H amplifiers.

By the electronic switching system described, the signals from the vertical loop antenna 27 will be conducted to the input 47 of the H amplifier 29 during the interval when the signals from the non-directional antenna 26 are conducted to the input 46 of the V amplifier 28. The signals from the horizontal antenna 31 are conducted to the input 46 of the V amplifier 28 during the interval when the signals from the vertical antenna 26 are conducted to the input 47 of H amplifier 29. A potentiometer arrangement 56 connected across a uni-potential source 57 is used to obtain the optimum bias for the operation of the electronic switching tubes 37 and 38. The potentiometer arm 58 is connected to the center tap of the secondary winding 41.

It is to be understood that the V or H amplifiers may be radio frequency amplifiers but are preferably superheterodyne ampliers for producing a predetermined intermediate frequency at the output transformers 60 and 61 respectively. A common beat frequency oscillator is then used for the V and H amplifiers in a manner fully described in the parent application Serial No. 43,189. The use of superheterodyne reception permits more selective tuning, greater amplification and more stable operation of the system as therein described.

The intermediate frequency transformers 60 and 61 are preferably step-up transformers to assure a proper high voltage operation of the cathode ray tube. The secondary winding 62 of transformer 60 is tuned to the proper frequency by condenser 63. The center tap of the secondary winding 62 is connected to ground potential as shown. Terminal 64 of winding 62 is connected to the vertical deflecting plate 66 through coupling condenser 65. The opposite terminal of winding 62 is connected to the other vertical deflecting plate 67 of the cathode ray tube 25. It is accordingly evident that the output of the V amplifier is connected across the vertical deflecting plates 66—67 to produce a vertical indication upon the cathode ray screen 30.

The output of the H amplifier is directly connected across the horizontal deflecting plates 70 and 71 by means of the step-up secondary winding 72 tuned to the proper intermediate frequency by condenser 73. The center tap of the secondary winding 72 is connected to ground. The non-directionally received signal tuned to the localizer station 14 will normally produce a vertical line image during the interval of connection to the vertical deflecting plates 66—67; and will normally produce a horizontal line image, when connected across horizontal deflecting plates 70—71. The actuation of the horizontal deflecting plates 70—71 by the vertical loop 27 signals during the production of the vertical line image will cause the vertical line image to incline to the right or left in accordance with the angular position of the vertical loop antenna 27 with respect to the transmitting station.

The actuation of vertical deflecting plates 66—67 by the signals received from the horizontal loop antenna 31 will coact with the horizontal line image to angularly deflect the horizontal line image in accordance with the angular position of the horizontally positioned loop 31 with respect to the vertically polarized localizer beam from transmitter 14. Since the horizontal position of the loop corresponds to the horizontal position of the air-craft, the angular deflection of the horizontal beam will correspond to the tilting of the air-craft as will now be evident to those skilled in the art.

Both the horizontal and vertical beams simultaneously appear upon the screen 30. The elements of the system in Figure 3 thus far described apprise the pilot when he is flying at an angle to the right or left of the transmitter station 14 as well as show him the tilting angle of his air-craft.

The marker beacon receiver 75 is tuned to the predetermined marker beacon frequency, for example 75 megacycles. A doublet antenna 76 is preferably employed for the marker beacon receiver, the signals of which are tuned by the variable condenser 77 and introduced to a triode detector stage 78. The output of the detector 78 is coupled to a first and second audio frequency amplifier stage 79 and 80. A radio frequency choke coil and by-pass condenser 82 are used in conjunction with the detector 78 to prevent high frequency signal components from passing to the audio frequency amplifier stages. The second audio frequency stage 80 is preferably a pentode amplifier having an audio frequency transformer 83 connected in its output. The audio frequency signals corresponding to the modulations of marker beacon signals are directly impressed across the horizontal deflecting plates 70—71 through radio frequency choke coils 84 and 85. The radio frequency choke coils 85 and 84 prevent the conduction of the intermediate or radio frequencies to the transformer 83. Blocking condensers 86 and 87 are used to prevent the short-circuiting of the audio frequency signals through the secondary winding 72. The marker beacon signals when received are superimposed upon the horizontal voltage to produce a pattern array upon the screen 30, as will be hereinafter described in more detail to accurately apprize the operator when the air-craft is passing through the marker beacon signal zone.

Figure 4 illustrates an image 90 upon a cathode ray screen 30 corresponding to the reception of a marker beacon signal by the receiver 75. The audio frequency signal impressed upon the horizontal deflecting plates acts to spread out the image upon the screen 30. An important feature of my present invention is to so design the modulation frequency of the respective marker beacons so as to have different harmonics or subharmonics of the tone or audio modulation frequency of the localizer beacon producing the A—N signals. The localizer beacon modulation corresponds to the audio frequency in the equi-signal zone 15 (Figure 1). By so designing the respective audio frequency modulations of the marker beacon signals with respect to the localizing beacon signals, a substantially stationary pattern, in one instance corresponding to a shape as shown at 90 in Figure 4 will appear upon the screen 30 of the cathode-ray tube. The envelope 91 of the pattern 90 will have a number of convolutions corresponding to relative harmonic ratio between the modulations of the marker beacon signals and the localizer beacon signals and will now be evident to those skilled in the art. Thus, by assigning different frequency ratios to the audio frequency components to the respective marker beacons E, F and Z, the pilot will know in a definite manner exactly over which beacon he is flying by observing the type of pattern appearing upon the cathode ray screen 30.

A further important feature of my present invention resides in the utilization of glide path receiver 92 in conjunction with the horizontal line image appearing on the cathode ray screen 30 to raise or lower the line image above the central position in accordance with the relative position of the air-craft with respect to the predetermined intensity glide path 16 (Figures 1 and 2). The ultra-high frequency glide path signals are received by the antenna 93 and impressed upon the receiver 92 tuned by the variable condenser 94. The signals are rectified by detector stage 95. The triode rectifier 95 is preferably a high mu tube biased to cut-off to produce a uni-directional signal output through the radio frequency choke coil 96. A by-pass condenser 97 is connected across the output of the triode 95.

The uni-directional output of detector 95 is connected directly to the grid of the direct current amplifier stage 98. The direct current output of amplifier 98 is connected to one of the vertical deflecting plates 66 through a radio frequency choke coil 99. The uni-directional variation at the output of the glide path receiver 92 is designed to alter the direct current potential of one of the vertical deflecting plates in order to change the normal position of the horizontal image appearing on screen 30. The lower vertical deflecting plate 67 is at ground potential which corresponds to +600 volts used for energizing the electrodes of the cathode ray tube 25. The direct current potential of the upper vertical deflecting plate 66 is changed in accordance with the relative intensity of the glide path signals as received by antenna 93.

In a preferred arrangement, the B-battery 100 for the glide path receiver 92 is 200 volts and the normal anode current through the amplifier 98 produces a 50 volt drop through the anode resistor 101. Accordingly, the net difference in potential between the negative terminal 102 of battery 100 and the output terminal 103 of receiver 92 is 150 volts during zero signal reception by antenna 93.

In order to maintain the horizontal line image in its normal central position during predetermined glide path 16 travel by the aircraft, the negative end of the battery 100 is connected to a point $a$ on the high voltage potentiometer 104 for the cathode ray tube electrodes. The variable tap 105 of potentiometer 104 is adjusted by the operator to the point $a$ which will produce a voltage between points $b$ and $a$ on the potentiometer 104, to counteract the voltage between points 102 and 103 of the glide path receiver applied to the deflecting plate 66 during the reception of a predetermined glide path signal intensity.

The position of tap 105 on point $a$ of potentiometer 104 accordingly balances out the voltage increment due to the direct current output potential from receiver 92, and positions the horizontal line image centrally on the fluorescent screen 30 during reception of predetermined intensity signals from the 90 megacycle glide path transmitter.

When the plane falls below the predetermined glide path signal intensity position such as indicated at $h'$ in Fig. 2, a lower signal intensity will be received by antenna 93 and cause less current to flow through the coupling resistor 106 at the output of detector 95. The decrease in current through resistor 106 causes an increase in potential upon the grid of tube 98 and more current to flow through resistor 101 and to correspondingly reduce the actual potential at point 103. Thus the fixedly biased electrode 67 will be at a higher potential with respect to variably biased electrode 66, and the horizontal beam will be moved beneath the central horizontal position. The pilot accordingly is immediately apprized of the fact that the air-craft is beneath the predetermined glide path signal level and maneuvers his mechanical control to bring the plane up to the glide level when the voltage output at point 103 will cause the electrode 66 to have the same potential as the opposite vertical deflecting electrode 67, and will center the beam.

Conversely, when the plane is above the predetermined glide path 16, as indicated at $e'$ in Figure 2, antenna 93 will impress a greater than normal signal intensity upon detector 95 and cause more current to flow in coupling resistor 106 correspondingly decreasing the potential upon the grid of amplifier tube 98 to cause less current to flow in resistor 101 and thereby increase the potential at the output 103 of the glide path receiver 92. The increased potential at point 103 will correspondingly increase the voltage of vertical electrode 66 with respect to the electrode 67 and thereby raise the horizontal line image above the normal position to apprise the pilot that he is above the predetermined glide path 16 level so that he may manoeuvre his plane to lower it to the proper position in the glide path 16.

To approximate the constant rate of descent method of landing approach using the ordinary lemon-shaped glide path 16, a clockwork mechanism 107 can be attached to the arm 105 of the variable tap in the potentiometer to continuously vary the direct current voltage conditions of the vertical electrodes 66 and 67 to alter the effect of the predetermined equi-potential glide path signals to produce the constant rate descent landing approach.

It is to be understood that modifications can readily be made in the system as compared to the actual disclosed embodiment thereof. For example, the output 103 of glide path receiver 92 may be connected to the lower deflecting plate 67 by correspondingly redesigning the glide path receiver to reverse the effective polarity as compared to the described receiver. This effect can be accomplished by adding a direct current amplifier stage to the illustrated receiver.

In order to facilitate the interpretation of the vertical and horizontal line images, I provide an index 110 attached to the face 30 of the cathode-ray tube 25 as shown in Figure 4. The index 110 contains two crossed arms 111 and 112 respectively, each arm containing a central slot through which the image is clearly visible. A central hole 113 is preferably used to determine the central position of the spot of light before deflection by the signal voltages. Although the index 110 may be of opaque material, I prefer to use a translucent material therefor, so that the images may be visible to some degree even when they project beneath portions of the index 110.

Figures 5 and 6 illustrate a preferred arrangement for the various antennae upon the air-craft for receiving the various voltages hereinabove described. The non-directional antenna is indicated at 26 as a vertical mast mounted toward the rear of the aircraft 115. The vertical loop antenna 27 is mounted within a streamlined housing 27' external of the aircraft hull, and shown on the top of the aircraft. The vertical loop antenna contained within streamlined housing 27' is preferably rotatable to attain "on-course" bearings when flying at an angle to a station. The streamlined housing is used to reduce to a minimum the aero-dynamic resistance of the loop structure as fully described in my co-pending application Serial No. 43,189 and forms the basis of my Patent No. 2,062,129, which issued on November 24, 1936.

The marker beacon doublet antenna 76 is shown mounted toward the rear of the plane although any other optional mounting therefor may be used. The glide path antenna 93 is shown as a straight wire antenna strung beneath the aircraft. The horizontal loop antenna, used to show the tilt angle of the aircraft, is located within the streamlined housing 31' mounted below the hull of the aircraft 115 and toward the front.

Figure 7 is a cross-sectional view taken along 7—7 of Figure 6 vertically through the horizontal loop structure 31'. The horizontal loop 31 is preferably located at a symmetrical position with respect to the aircraft 115, and the horizontal axis of the loop 31 is preferably parallel to the axis of the aircraft 115. The horizontal loop 31 is preferably rigidly mounted upon a base portion 116 secured to the aircraft 115. It will now be evident that the coaction of the horizontally disposed loop antenna 31 with the vertically polarized radio waves from the localizer beacon 14 will produce a deflection component to the horizontal line image resulting from the non-directionally received signals 26 when electronically switched on the horizontal deflecting plates 70 and 71 of the cathode-ray tube 25.

A further important feature of my present invention resides in providing an indication to the pilot just before the aircraft landing gear touches the ground in landing. As seen in Figures 5 and 6, a rod 117 is subtended beneath the landing gear adjacent each of the landing wheels 118. The rods 117 may be in the form of leaf springs secured to the axle 119 of the landing gear. The end portion 120 of rod 117 is curved upwardly to readily follow along the ground 121 when making physical contact therewith. The rod or springs 117 are so arranged that they project 8 or 10 inches below the bottom of the landing wheels 118, so as to force rod 117 upwardly to close the electric contacts 122 just before the landing wheels 118 touch the ground. The contacts of the landing switch 122 are connected by high frequency choke 123 and leads 124 respectively between the upper vertical deflecting electrode 66 and an intermediate position on the potentiometer 104. The connection to the potentiometer 104 may be through the variable tap 105 which is at a negative potential with respect to the 600 volt operating potential for the cathode-ray tube electrodes.

It will now be evident that when either of the landing switch arms 117 are actuated by a physical contact with ground to close the switch 122 which is located at each of the switch arms 117 (and electrically connected in parallel, not shown) the upper electrode 66 will be made definitely negative with respect to the lower electrode 67 causing the horizontal line image to be depressed below the central position. At this instant the pilot will actually receive a below glide path (16) indication and will automatically manoeuvre the plane to move upwards towards the glide path, which impulse is just that required to effect a smooth landing operation of the aircraft.

Modifications are entirely feasible with the preferred described system used for illustrating the principles of my invention. Switching details which have been omitted for the sake of simplification in the diagrammatic representation, may be employed for disconnecting from operation the marker beacon and glide path receivers as well as the horizontal loop antenna 31 with the associated electronic switching. The components of the system illustrated in Figure 3 are ample for providing the normal right-left indications as in the right-left indicator described in the parent application Serial No. 43,189. The operation of the system as a whole employs the components requisite for right-left indicator operation during normal flight condition. Before blind landing manoeuvring, when the pilot is prepared to be guided by the blind landing signals, he need simply turn a master switch which by direct action or through relays energizes the necessary components for connecting the system in circuital relation as indicated in Figure 3. This includes energizing the electronic switching system, the marker beacon and glide path receivers, and connecting the counterbalancing biasing arrangement with potentiometer system 104—105. An aural receiver, not shown, may be connected to the output of the V amplifier when cooperating continuously with the non-directional antenna 26 before blind landing manoeuvres.

I shall now describe the operating details of my preferred arrangement of the blind landing composite indicator system. Reference is made to Figures 1 and 2 in connection with the cathode-ray diagrams A to L which occur during various conditions of manoeuvring of the aircraft 115 during blind landing. The following is a procedure which the pilot goes through in approaching the radio range 22 and in effecting a blind landing of his plane upon lane 12 of airfield 10:

The pilot employs the system as a normal right-left indicator for some time before he approaches the vicinity of the radio range beacon 22. The frequency of this beacon is preferably in the commercial aircraft beacon range of 200 to 400 kilocycles. As the pilot approaches the vicinity of the radio range beacon 22, as shown by the position a' in Figure 2, the indication on the screen seen at A becomes elliptical. When the plane is "on-course," the ellipse is vertical as shown. If the pilot has been operating the system as a simple right-left indicator, he at this time throws the master switch which energizes all the components of the system and connects them in their proper operating relationships, as shown in Figure 3.

When the plane continues to the position b' (Fig. 2) it passes into the signal range 23 of the Z marker beacon which is coincident with the cone of silence of the radio range beacon 22. If no Z marker beacon were used, the pattern on the cathode ray screen would be circular in the cone of silence. However, I prefer to employ a Z marker beacon to more positively indicate the position of the aircraft above the radio range beacon. The pattern on the cathode ray screen becomes a flat cylinder as shown in diagram B. If the modulation frequency of the Z marker beacon were a harmonic or sub-harmonic modulation frequency of the localizer beacon, a definite envelope would appear on the screen similar to the envelope 91 in Figure 4 but having a number of convolutions in accordance with the ratio of the modulation frequencies. However, if the E and F marker beacons are thusly proportioned, it is not necessary for the modulations of the Z marker beacon to be harmonically related since the solid cylindrical image would be sufficiently distinctive to the pilot.

When the pilot reaches the position shown at b' above the radio range beacon 22, he continues flying for about two miles to reach a position behind the E marker beacon. The pilot then flies toward the equi-signal zone 15 and in a direction "on-course" with respect to the localizer transmitter at 14 along the horizontal path 16 shown at Figure 1.

The "on-course" indication will be evident upon the cathode ray screen as a vertical line image. If the direction of the plane is to the right or left of the predetermined "on-course" position, the vertical line will correspondingly deflect to the right or left. However, any other radial position of flight toward the transmitter 14 will also cause a vertical "on-course" indication.

The combination of the vertical indication with the A—N signals serve to direct the pilot not only on a radial path to the station 14 but also within the boundary of the equi-signal zone 15. When the pilot passes beyond the zone 15 into, for example, the A beam sector, the vertical line image will not appear as a continuous line but as a line which flickers on and off in correspondence with the dot and dash components of the A signal. The dot appears as an image of shorter duration than the dash upon the screen. Thus, even though the indication line may be in a vertical position, the pilot may be to the right or left of the equi-signal path 15. When the pilot sees a fluctuating vertical line image, he can read the A or N signals therefrom and by these fluctuations can immediately tell whether he is in the A or N quadrants and thereby correct his position with respect to the equi-signal zone as will now be evident.

In flight, in the equi-signal zone 15 toward the landing field 10, the pilot first passes through the E marker beacon signal zone 19. The position is indicated at c'. The indication on the cathode ray indicator is shown at C during the flight of the aircraft through the E marker beacon signals. As already stated, the modulation frequency of the E marker beacon is a multiple or sub-multiple of the modulation frequency of the localizer beacon transmitter 14. The A—N signals and the regular pattern shown at C results in a characteristic shape which the pilot can immediately recognize as showing definitely his passing over the E marker beacon while is at, say 1½ miles from the edge 21 of the landing field 10.

The E marker beacon transmitter 130 is interconnected with the F marker beacon transmitter and the localizer transmitter 14 by means of connection leads 133 to accurately deliver the harmonic or sub-harmonic modulation frequencies to the respective transmitters so as to maintain a stationary marker beacon pattern as will be evident to those skilled in the art.

The D indication on the cathode ray screen corresponds to the position of the aircraft to the right of the transmitter 14 at d'', above the glide path 16 at d', and with a tilting of the aircraft clockwise as viewed from the dotted representation at d'''. Thus the vertical indication is seen inclined toward the right corresponding to the position of the plane at d''; and the position of the horizontal image is above the central position on the screen and inclined clockwise to correspond to the inclination of the aircraft at d'''.

At E, the pilot has already regained his "on-course" direction as seen at e'' and by the vertical position of the cathode ray image. However, the plane is seen above the predetermined glide path position 16 at e', the horizontal line image being located above the central position as seen at E. The plane as seen at e''' is not tilted, so that the signals received in the horizontal loop antenna 31 are zero, offering no deflection component to the horizontal image which appears horizontal on the screen.

In the position F of the plane, we find that it is to the left of the "on-course" position (f'') producing a deflection of the vertical image to the left; is in the predetermined glide path 16 at f' offering a central position of the horizontal beam; and is tilted counterclockwise as seen at f''', correspondingly tilting the horizontal image in the same direction. In order to minimize any confusion between the vertical and horizontal images, I prefer to make the deflectional sensitivity of the vertical image less than the deflectional sensitivity of the horizontal image during blind landing operation of the system.

In position G, the aircraft is shown below the glide path 16 at g' causing the horizontal image to fall below the central position; is to the right of the "on-course" position at g'' causing a deflection of the vertical image to the right; and is tilted counterclockwise as seen at g''' to cause a corresponding clockwise deflection of the horizontal image.

At H, the plane is still below the predetermined glide path position 16 (h') causing the horizontal line image to move toward the central position; is "on-course" at h'' producing a vertical indication on the screen; and is not tilted (h'''), causing a corresponding horizontal disposition of the horizontal image.

At position I, the plane is still "on-course" at i'' resulting in a vertical image on the screen; is on the glide path at i' causing the horizontal beam to be centrally located; and is tilted clockwise (i''') to correspondingly tilt the horizontal deflection.

At position J, the plane is in the most exact position with respect to signals being "on-course" (j''), in the glide path 16 (j'), and horizontally disposed (j'''), ready for a perfect blind landing. The image shown upon the screen J for the perfect landing condition comprises two perpendicularly crossed images, one vertical and one horizontal. If the vertical image flickers due to the A or N dot-dash reception, the pilot knows he is not in line with the lane 12, and must accordingly readjust his position. However, once the pilot is in the equi-signal zone 15, he usually readily maintains an "on-course" on-lane flight, while manoeuvring the plane into the glide path 16 position.

When the pilot reaches the F marker beacon by-passing through the signal zone 20 thereof, the indication on the screen, shown at K, is a stationary pattern having an envelope of a predetermined shape corresponding to the ratio of the modulation frequencies as already explained. The pilot at this stage knows that he is near the edge of the landing field.

Just before landing on lane 12 at position L the landing switch 117 physically contacts the ground to close the switch contacts 122 (Figures 3 and 8), to throw the horizontal beam below the normal central position as shown in diagram L. The pilot instinctively will tend to direct the plane upwardly as though he were trying to fly up to the predetermined glide path intensity. This instinctive action by the pilot facilitates a perfect three-point landing of the aircraft.

I claim:

1. In a radio guidance system for aircraft, a cathode ray tube indicator; a plurality of antennae carried by said aircraft responsive to predetermined glide path signals and circuit connections from the outputs of said antennae to said cathode-ray tube; means operable from certain of said antennae for producing an indication indicative of on course position of the aircraft on the screen of said cathode-ray tube when said aircraft is in predetermined relation to said glide path signals; and means operable from others of said antennae for raising and lowering, moving to the right and to the left and tilting said indication from the on course position in accordance with the corresponding variations of the relative position of the aircraft and the antennae with respect to the glide path signals.

2. In a radio guidance system for an aircraft, a cathode-ray tube indicator having a plurality of pairs of deflecting plates and having a single screen; receiver means for each pair of said deflecting plates; the receiver means connected to one pair of deflecting plates producing a predetermined pattern in a region of said screen; the receiver means connected to another pair of deflecting plates being responsive to a plurality of marker beacon signals for producing a distinctive variation of said pattern in said region of said screen in a manner characteristic of the particular marker beacon signal being received.

3. In a radio guidance system for an aircraft, a unitary composite indicator; means for transmitting vertically polarized signal waves from a landing field; means responsive to the transmitted signal waves from the landing field and connected to said indicator for producing an indication deflected to the right or left in accordance with the direction of the aircraft with respect to the transmitter of said signals; and a directional antenna horizontally mounted on said aircraft and associated circuit elements, responsive to the vertically polarized waves of said transmitted signals for producing a second indication on said indicator, deflected clockwise or counterclockwise in accordance with tilting of the aircraft and intersecting said right and left indication in a common region of said composite indicator.

4. In a radio guidance system for an aircraft, a cathode-ray tube indicator; means for transmitting vertically polarized signal waves from a landing field; means responsive to the transmitted signal waves from the landing field and connected to said indicator for producing a vertical line indication deflected to the right or left in accordance with the direction of the aircraft with respect to the transmitter of said signals; and a directional antenna horizontally mounted on said aircraft and associated circuit elements, responsive to the vertically polarized waves of said transmitted signals and connected to said cathode ray tube for producing a horizontal line indication on said indicator, deflected clockwise or counterclockwise in accordance with tilting of the aircraft and intersecting said right and left indication in a common region of said indicator.

5. In a radio guidance system for an aircraft, a cathode-ray tube indicator having a screen; means responsive to transmitted signal waves from a landing field and connected to said indicator for producing a vertical line indication on said screen deflected to the right or left in accordance with the direction of the aircraft with respect to the transmitter of said signals; a receiver responsive to predetermined transmitted glide path signals and means including circuit connections from the output of said receiver to said cathode-ray indicator for raising and lowering the normal position of a second indication on the screen of said indicator in correspondence with the relative position of the aircraft with respect to the predetermined glide path, said right and left and second indications intersecting on said screen.

6. In a radio guidance system for an aircraft, a cathode-ray tube indicator; means responsive to transmitted signal waves from a landing field and connected to said indicator for producing a vertical line indication deflected to the right or left in accordance with the direction of the aircraft with respect to the transmitter of said signals; a receiver responsive to predetermined transmitted glide path signals and means including circuit connections from the output of said receiver to said cathode-ray indicator for raising and lowering the normal position of an indication on said indicator in correspondence with the relative position of the aircraft with respect to the predetermined glide path; and receiver means responsive to a plurality of marker beacon signals connected to said cathode-ray tube indicator for producing a distinctive pattern on the screen of the cathode-ray tube in a manner characteristic of the particular marker beacon signal being received.

7. In a radio guidance system for an aircraft, a composite indicator; means responsive to transmitted signal waves from a landing field and connected to said indicator for producing a vertical line indication deflected to the right or left in accordance with the direction of the aircraft with respect to the transmitter of said signals; a receiver responsive to predetermined transmitted glide path signals and means including circuit connections from the output of said receiver to said indicator for raising and lowering the normal position of a second indication on said indicator in correspondence with the relative intensity of the aircraft with respect to the predetermined glide path, said vertical and second indications intersecting in a common region of said indicator; and receiver means responsive to marker beacon signals connected to said composite indicator for distorting the normal intersecting indications thereof in a manner characteristic of the particular marker beacon signal being received.

8. In a radio guidance system for an aircraft, a composite indicator; means responsive to transmitted signal waves from a landing field and connected to said indicator for producing a vertical line indication deflected to the right or left in accordance with the direction of the aircraft with respect to the transmitter of said signals; a receiver responsive to predetermined transmitted glide path signals and means including circuit connections from the output of said receiver to said indicator for raising and lowering the normal position of a second indication on said indicator in correspondence with the relative position of the aircraft with respect to the predetermined glide path, said vertical and second indications intersecting in a common region of said indicator; receiver means responsive to marker beacon signals connected to said composite indicator for distorting the normal intersecting indications thereof in a manner characteristic of the particular marker beacon signal being received; and means projecting below the landing gear of the aircraft including circuit connections to said indicator for producing an indication on said common region of the composite indicator just before the landing of the aircraft whereby the pilot is apprised of the flight conditions on a common point of vision.

9. In a radio guidance system for an aircraft, a cathode-ray tube indicator; means responsive to transmitted signal waves from a landing field and connected to said indicator for producing a vertical line indication deflected to the right or left in accordance with the direction of the aircraft with respect to the transmitter of said signals; a receiver responsive to predetermined transmitted glide path signals comprising a rectifier and a direct current amplifier connected to the output of the rectifier for producing a direct current voltage varying in magnitude in accordance to the received intensity of the glide path signals and means including circuit connections from the output of said direct current amplifier to said cathode-ray indicator for raising and lowering the normal position of an indication on said indicator in correspondence with the relative position of the aircraft with respect to the predetermined glide path; and means projecting below the landing gear of the aircraft for altering an indication on the cathode-ray tube indicator just before the landing of the aircraft comprising a switch for short-circuiting the effect of said glide path receiver on said indicator.

10. In a radio guidance system for an aircraft, a cathode-ray tube indicator; means responsive to transmitted signal waves from a landing field and connected to said indicator for producing a vertical line indication deflected to the right or left in accordance with the direction of the aircraft with respect to the transmitter of said signals; a receiver responsive to predetermined transmitted glide path signals comprising a rectifier and a direct current amplifier connected to the output of the rectifier for producing a direct current voltage varying in magnitude in accordance to the received intensity of the glide path signals and means including circuit connections from the output of said direct current amplifier to said cathode-ray indicator for raising and lowering the normal position of an indication on said indicator in correspondence with the relative position of the aircraft with respect to the predetermined glide path; receiver means responsive to a plurality of marker beacon signals connected to said cathode-ray tube indicator for producing a distinctive pattern on the screen of the cathode-ray tube in a manner characteristic of the particular marker beacon signal being received; and means projecting below the landing gear of the aircraft for altering an indication on the cathode-ray tube indicator just before the landing of the aircraft comprising a switch for short-circuiting the effect of said glide path receiver on said indicator.

11. In a radio guidance system for an aircraft, a composite indicator; means responsive to transmitted signal waves from a landing field and connected to said indicator for producing a vertical line indication deflected to the right or left in accordance with the direction of the aircraft with respect to the transmitter of said signals; a directional antenna horizontally mounted on said aircraft and associated circuit elements responsive to the vertically polarized waves of said transmitted signals for producing a horizontal line indication on said indicator, deflected clockwise or counterclockwise in accordance with tilting of the aircraft; a receiver responsive to predetermined transmitted glide path signals and means including circuit connections from the output of said receiver to said indicator for raising and lowering the normal position of said horizontal line indication in correspondence with the relative position of the aircraft with respect to the predetermined glide path; and means projecting below the landing gear of the aircraft for altering an indication on the composite indicator just before the landing of the aircraft.

12. In a radio guidance system for an aircraft, a composite indicator; means responsive to transmitted signal waves from a landing field and connected to said indicator for producing a vertical line indication deflected to the right or left in accordance with the direction of the aircraft with respect to the transmitter of said signals; a directional antenna horizontally mounted on said aircraft and associated circuit elements responsive to the vertically polarized waves of said transmitted signals for producing a horizontal line on said indicator, deflected clockwise or counterclockwise in accordance with tilting of the aircraft; a receiver responsive to predetermined transmitted glide path signals and means including circuit connections from the output of said receiver to said indicator for raising and lowering the normal position of said horizontal line indication in correspondence with the relative position of the aircraft with respect to the predetermined glide path; receiver means responsive to marker beacon signals connected to said composite indicator for distorting the normal directional indications thereof in a manner characteristic of the particular marker beacon signal being received; and means projecting below the landing gear of the aircraft for altering an indicator on the composite indicator just before the landing of the aircraft.

13. In a radio guidance system for an aircraft, a plurality of antennae, a cathode-ray tube indicator having deflecting plates corresponding to said antennae; a receiver responsive to predetermined transmitted glide path signals and means including circuit connections from said antennae to associated deflecting plates in said cathode ray indicator for raising and lowering the normal position of an indication on said indicator in correspondence with the relative position of the aircraft with respect to the predetermined glide path; and receiver means responsive to a plurality of spaced marker beacon signals connected to said cathode-ray tube indicator for producing a distinctive pattern on the screen of the cathode-ray tube in a manner characteristic of the particular marker beacon signal being received.

14. In a radio guidance system for an aircraft, a cathode-ray tube indicator; a receiver responsive to predetermined transmitted glide path signals comprising a rectifier and a direct current amplifier connected to the output of the rectifier for producing a direct current voltage varying in magnitude in accordance to the received intensity of the glide path signals, and means including circuit connections from the output of said direct current amplifier to said cathode ray indicator for raising and lowering the normal position of an indication on said indicator in correspondence with the relative position of the aircraft with respect to the predetermined glide path; and means projecting below the landing gear of the aircraft for altering a glide indication on the cathode-ray tube indicator just before the landing of the aircraft.

15. In a radio guidance system for an aircraft, a plurality of antennae, a cathode ray tube indicator having deflecting plates corresponding to said antennae; circuit connections from said antennae to associated deflecting plates including a receiver connected to said deflecting plates responsive to predetermined transmitted glide path signals comprising a rectifier and a direct current amplifier connected to the output of the rectifier for producing a direct current voltage varying in magnitude in accordance to the received intensity of the glide path signals and means including circuit connections from the output of said direct current amplifier to the deflecting plates of said cathode-ray indicator for raising and lowering the normal position of an indication on said indicator in correspondence with the relative position of the aircraft with respect to the predetermined glide path; and receiver means responsive to a plurality of marker beacon signals connected to said cathode-ray tube indicator for producing a distinctive pattern on the screen of the cathode-ray tube in a manner characteristic of the particular marker beacon signal being received.

16. In a radio guidance system for an aircraft, a cathode-ray tube indicator; a receiver responsive to predetermined transmitted glide path signals comprising a rectifier and a direct current amplifier connected to the output of the rectifier for producing a direct current voltage varying in magnitude in accordance to the received intensity of the glide path signals and means including circuit connections from the output of said direct current amplifier to said cathode-ray indicator for raising and lowering the normal position of an indication on said indicator in correspondence with the relative position of the aircraft with respect to the predetermined glide path; receiver means responsive to a plurality of marker beacon signals connected to said cathode-ray tube indicator for producing a distinctive pattern on the screen of the cathode-ray tube in a manner characteristic of the particular marker beacon signal being received; and means projecting below the landing gear of the aircraft for altering a glide indication on the cathode-ray tube indicator just before the landing of the aircraft.

17. In a radio guidance system for an aircraft, a composite indicator; a directional antenna horizontally mounted on said aircraft and associated circuit elements responsive to the vertically polarized waves of a transmitted signal for producing a horizontal line indication on said indicator, deflected clockwise or counterclockwise in accordance with tilting of the aircraft; a receiver responsive to predetermined transmitted glide path signals and means including circuit connections from the output of said receiver to said indicator for raising and lowering the normal position of said horizontal line indication in correspondence with the relative position of the aircraft with respect to the predetermined glide path; and means projecting below the landing gear of the aircraft for altering a glide indication on the composite indicator just before the landing of the aircraft.

18. In a radio guidance system for an aircraft, a composite indicator; a directional antenna horizontally mounted on said aircraft and associated circuit elements responsive to the vertically polarized waves of a transmitted signal for producing a horizontal line on said indicator, deflected clockwise or counterclockwise in accordance with tilting of the aircraft; a receiver responsive to predetermined transmitted glide path signals and means including circuit connections from the output of said receiver to said indicator for raising and lowering the normal position of said horizontal line indication in correspondence with the relative position of the aircraft with respect to the predetermined glide path; receiver means responsive to marker beacon signals connected to said composite indicator for distorting the normal directional indications thereof in a manner characteristic of the particular marker beacon signal being received; and means projecting below the landing gear of the aircraft for altering a glide indication on the composite indicator just before the landing of the aircraft.

19. In a radio system for an aircraft, a cathode ray tube indicator having a plurality of pairs of deflecting plates, means including one of said pairs of deflecting plates for producing a straight line indication on said indicator, a loop antenna horizontally mounted on said aircraft, circuit elements connecting said loop and another of said pairs of deflecting plates of said indicator and responsive to vertically polarized signals transmitted from a landing field for deflecting said indication on said indicator clockwise or counterclockwise in accordance with tilting of the aircraft.

EDWARD J. HEFELE.